(12) United States Patent
Love et al.

(10) Patent No.: US 12,335,122 B2
(45) Date of Patent: *Jun. 17, 2025

(54) DECENTRALIZED COMPUTING NETWORKS, ARCHITECTURES AND TECHNIQUES FOR PROCESSING EVENTS ACROSS MULTIPLE CHANNELS

(71) Applicant: SurgeTech M LLC, Loule (PT)

(72) Inventors: Michael Love, Marble Falls, TX (US); Blake Love, Austin, TX (US); Tiago Soromenho, Austin, TX (US)

(73) Assignee: SurgeTech M LLC, Loule (PT)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,043

(22) Filed: Apr. 18, 2023

(65) Prior Publication Data

US 2024/0187324 A1 Jun. 6, 2024

Related U.S. Application Data

(63) Continuation of application No. 18/074,418, filed on Dec. 2, 2022, now Pat. No. 11,665,076.

(51) Int. Cl.
| | |
|---|---|
| *H04L 43/0876* | (2022.01) |
| *G06Q 30/0201* | (2023.01) |
| *H04L 12/14* | (2024.01) |
| *H04L 41/0896* | (2022.01) |
| *H04L 41/0897* | (2022.01) |
| *H04L 47/12* | (2022.01) |

(52) U.S. Cl.
CPC ..... *H04L 43/0876* (2013.01); *G06Q 30/0206* (2013.01); *H04L 12/1489* (2013.01); *H04L 41/0896* (2013.01); *H04L 41/0897* (2022.05); *H04L 47/12* (2013.01)

(58) Field of Classification Search
None
See application file for complete search history.

(56) References Cited

U.S. PATENT DOCUMENTS

| | | | | |
|---|---|---|---|---|
| 10,848,988 | B1 * | 11/2020 | Rahman | H04L 41/5025 |
| 11,095,520 | B1 * | 8/2021 | Bhat | G06N 5/04 |
| 2020/0186607 | A1 * | 6/2020 | Murphy | G06Q 40/12 |

* cited by examiner

*Primary Examiner* — Shirley X Zhang
(74) *Attorney, Agent, or Firm* — Kevin Paganini, Esq.

(57) ABSTRACT

This disclosure relates to decentralized computing networks, architectures and techniques for collecting, analyzing, and processing data over multiple channels. A decentralized computing network comprises a plurality of computing nodes, each of which is dedicated to analyzing and processing events for a particular channel corresponding to a geographic region. Each node of the decentralized computing network can operate independently to process channel analysis data for a corresponding channel. The decentralized configuration of the nodes enables efficient processing of data collected over large geographic areas, increases the reliability of the system, and facilitates easy scaling of the system. Other embodiments are disclosed herein as well.

18 Claims, 11 Drawing Sheets

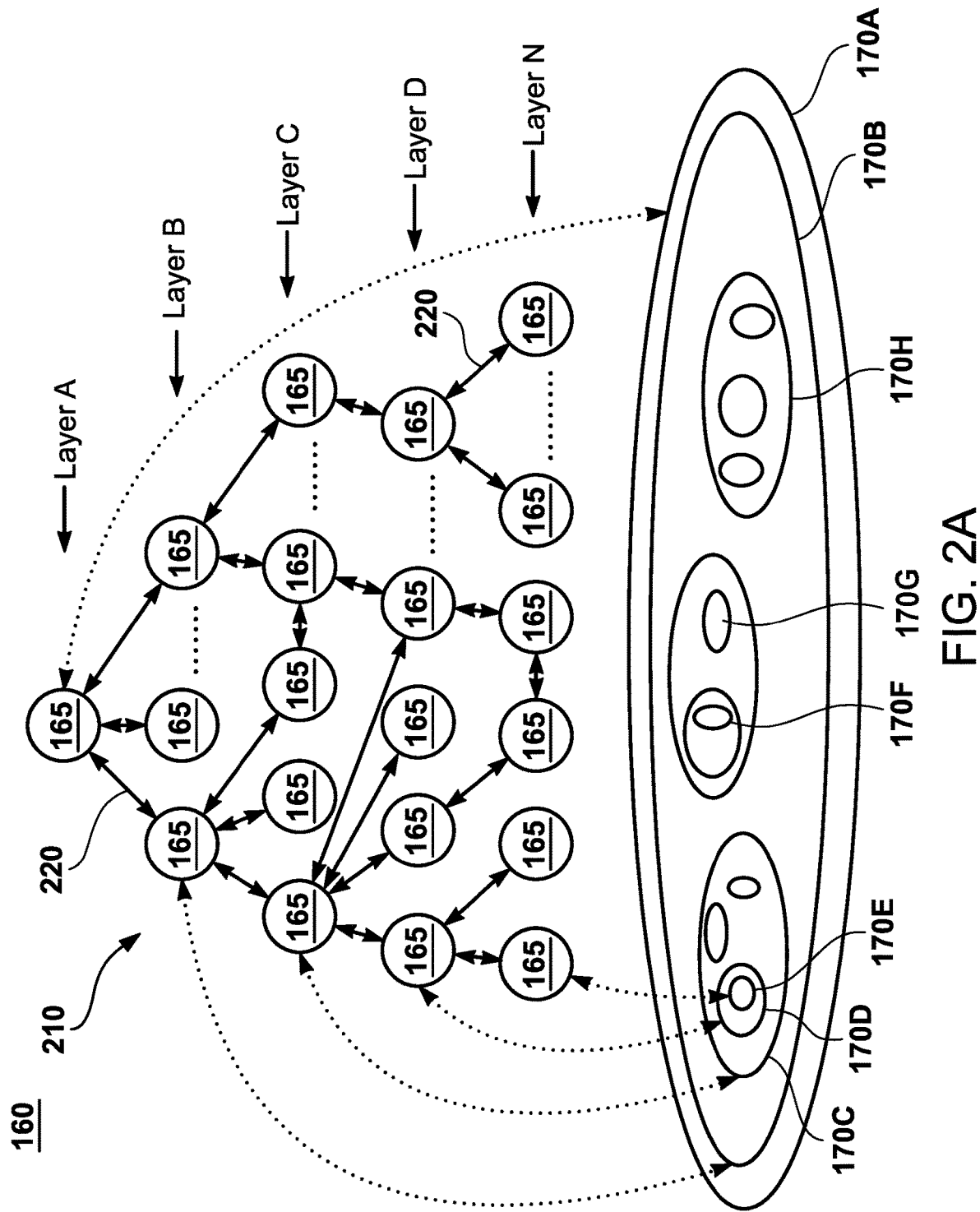

700

710 — Provide a decentralized computing architecture comprising a plurality of nodes

720 — Associating each node of the decentralized computing architecture with a separate channel corresponding to a geographic region

730 — Configuring each node of the decentralized computing architecture to receive and analyze channel events for the channel associated with the node

740 — Generating, by each node, channel analysis data corresponding to the channel associated with the node based, at least in part, on an analysis of the channel events corresponding to the channel associated with the node

750 — Executing one or more deployment functions that enable the channel analysis data to be accessed and utilized by one or more client systems

FIG. 7

DECENTRALIZED COMPUTING NETWORKS, ARCHITECTURES AND TECHNIQUES FOR PROCESSING EVENTS ACROSS MULTIPLE CHANNELS

CROSS-REFERENCE TO RELATED APPLICATIONS

The present application is a continuation of U.S. patent application Ser. No. 18/074,418, filed on Dec. 2, 2022. The content of the aforementioned application is herein incorporated by reference in its entirety.

TECHNICAL FIELD

This disclosure is related to decentralized computing networks, architectures, and techniques for processing events across multiple channels corresponding to distinct geographic regions, as well as systems, methods, and techniques for the same.

BACKGROUND

Traditional systems for monitoring or analyzing data across large geographic areas typically utilize a centralized network configuration. With a centralized network configuration, all data is collected for analysis and processing by a single, central authority (e.g., a central server) that manages data storage, communications, and data processing operations across the network. For example, in a typical scenario, a central authority may aggregate data across large geographic areas, separately analyze the data for each of the geographic areas, and communicate updates or instructions to devices across the network. Hence, all analysis and decision making across the geographic areas is performed by the central authority.

Utilizing a centralized network configuration to collect, analyze, and process data across large geographic areas can be disadvantageous for a variety of reasons. One disadvantage relates to that fact that processing aggregated data across large geographic areas with a single central authority can be computationally expensive, and can require large allocations of network storage and processing resources. Moreover, processing large collections of data in this manner can result in network latency, which can be attributed, at least in part, to the time required to process the data and communicate with devices over the network. In scenarios in which systems are intended to provide real-time data or functionality, these latency issues can significantly affect performance of the system and can prevent updates or other data from being disseminated across the network in a timely fashion.

Another disadvantage of traditional, centralized systems relates to their lack of scalability and flexibility. Centralized systems can be difficult to scale past a certain point because doing so typically requires additional storage, bandwidth, and/or processing power to be provided to the central authority. This can be particularly problematic in scenarios in which a system is rapidly expanding to cover new geographic areas, or in scenarios in which data-intensive upgrades are desired to improve the functionality of the system in existing geographic areas.

A further disadvantage of centralized systems can be attributed to the fact that the central authority serves as a single point of failure. If the central authority fails (either for technical reasons or due malicious cyberattacks), the entire system or network also will fail and become unavailable.

BRIEF DESCRIPTION OF DRAWINGS

To facilitate further description of the embodiments, the following drawings are provided, in which like references are intended to refer to like or corresponding parts, and in which:

FIG. 2A is a diagram illustrating an exemplary geographical hierarchy of nodes for a decentralized computing network according to certain embodiments;

FIG. 7 is a flowchart illustrating an exemplary method according to certain embodiments.

Figure 1A:
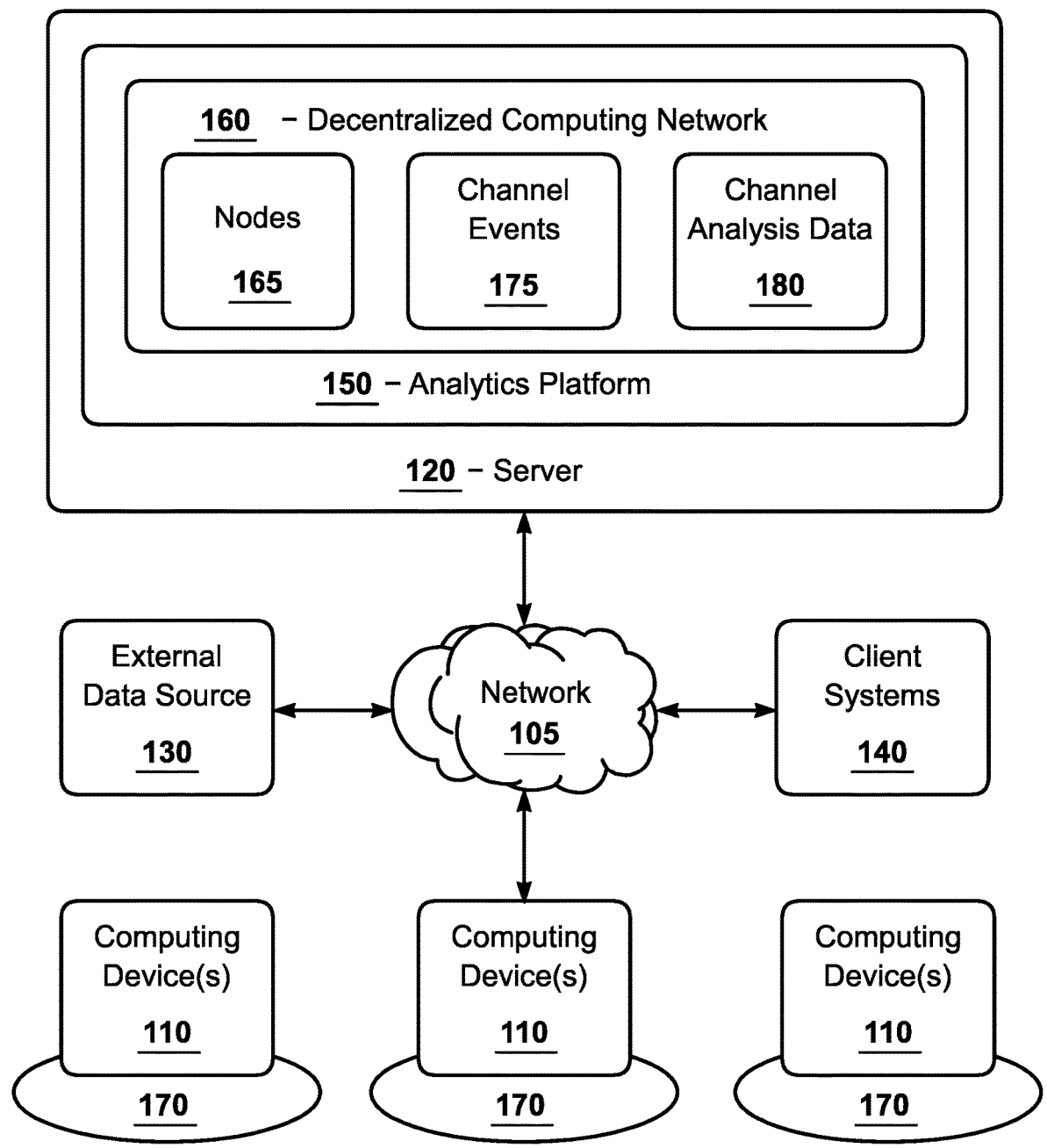
FIG. 1A is a diagram of an exemplary system according to certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "upper," "lower," "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the systems, methods, and/or articles of manufacture described herein are, for example, capable of operation in other orientations than those illustrated or otherwise described herein.

DETAILED DESCRIPTION OF EXEMPLARY EMBODIMENTS

The present disclosure relates to systems, methods, apparatuses, and computer program products that utilize decentralized computing networks, architectures and techniques to collect, analyze, and process data over multiple geographic areas. In certain embodiments, a decentralized computing network comprises a plurality of computing nodes, each of which is configured to collect, analyze, and process channel events for a channel that corresponds to a particular geographic region. Each node of the decentralized computing network can operate independently to process data originating from, or associated with, a given channel. For example, each node can receive channel events originating from, or associated with, a given channel, and can execute a channel analysis function to derive channel analysis data pertaining to the channel or its corresponding geographic region. As described in further detail below, the channel analysis data generated by each node can be used for various purposes. The decentralized configuration of the nodes enables efficient processing of data collected over large geographic areas, increases the reliability of the system, and facilitates easy scaling of the system.

In certain embodiments, the nodes included in the decentralized computing network can be arranged in a geographical hierarchy that is based on the channels or geographic areas associated with the nodes. The geographical hierarchy can establish parent-child relationships among the nodes, such that each child node corresponds to a geographic region that is a subset of a geographic region associated with a parent node. While each node can operate independently to process data for a corresponding channel or geographic region, a node communication protocol can enable information to be exchanged among the nodes based on relationships of the nodes to each other. For example, in some cases, a given node can exchange information with one or more parent nodes and/or one or more child nodes based on geographical associations or relationships. The exchange of information among the nodes avoids redundancies, reduces storage requirements, and increases efficiency with respect to generating the channel analysis data.

The types of channel events received and processed by each node can vary. The channel events can generally include any data relating to individuals located within a channel, activities occurring within the channel, and/or other conditions associated with the channel. For example, in some embodiments, the channel events received by a node for a given channel can include data indicating locations or movements of individuals (or devices operated by individuals) within the channel. The channel events also can include data relating to transactions conducted within the channel, weather conditions within the channel, merchants located within the channel, and events (e.g., concerts, conventions, sporting games, etc.) occurring with the channel. The channel events can include many additional attributes related to the channel itself and/or users within the channel. Further examples of channel events are described throughout this disclosure.

Each node of the decentralized computing network can execute a channel analysis function that is configured to analyze or process the channel events, and generate channel analysis data for a corresponding channel associated with the node. The channel analysis data generated by each node can vary. The channel analysis data for a given channel can include various metrics relating to the channel itself, individuals within the channel, and/or activities occurring within the channel. For example, the channel analysis data can indicate or predict the supply and/or demand within the channel for one or more products or services (e.g., riding sharing, hotel accommodations, parking garages, dining availability, sporting or event tickets, etc.). The channel analysis data also can identify or predict increases and/or decreases in the number of individuals within the channel, as well as intra-channel and inter-channel movements of those individuals. The channel analysis data can include many other metrics related to the channel, individuals in the channel, and/or activities occurring within the channel. Further examples of channel analysis data are described throughout this disclosure.

The channel analysis data generated by each node can include real-time analysis information that provides current or up-to-date data relating to the aforementioned metrics and/or other metrics. The channel analysis data also can include predictive analysis information that predicts a future status of the aforementioned metrics and/or other metrics. Examples of these real-time and predictive analytics are provided throughout this disclosure.

In certain embodiments, each of the nodes can utilize the channel analysis data to execute one or more demand adjustment functions. Additionally, or alternatively, the channel analysis data can be provided to one or more client systems that utilize the channel analysis data to execute the one or more demand adjustment functions. One exemplary demand adjustment function can include a pricing function that determines prices for one or more inventory items. For example, in some cases, the channel analysis data can be utilized by a surge pricing function to dynamically adjust prices for one or more inventory items in a manner that accounts for the supply and demand for the one or more inventory items. Another exemplary demand adjustment function includes an inventory management function that utilizes the channel analysis data to manage or adjust inventories (e.g., such as to dynamically reallocate inventory items among channels and/or initiate ordering of additional inventory items).

The channel analysis data generated by a given node can be utilized to execute one or more deployment functions that enable the channel analysis data to be utilized for a variety of purposes. In some scenarios, a deployment function can be executed to automate pricing systems (e.g., surge pricing systems) and/or inventory systems based on the channel analysis data. For example, the channel analysis data can be interfaced with pricing and inventory applications operated by one or more client systems (e.g., third-party systems) to automatically adjust the pricing of inventory (e.g., products or services) and/or automatically reallocate or reorder inventory based on the supply and demand metrics associated with the channel and/or based on the increases or decreases of individuals within the channel.

In another example, a deployment function can be executed to transmit notifications that include some or all of the channel analysis data. For example, notifications can be transmitted to client systems affiliated with merchants within the channel to disseminate real-time data and/or predictive data relating to the supply and demand of particular products or services. The merchant notifications also can include other information included in the channel analysis data (e.g., population surge information, event information, transaction patterns within the channel, movement patterns of individuals with the channel, etc.). Notifications also can be transmitted to individuals within the channel (e.g., to present offers or discounts to the individuals and/or recommend merchants located in the channel). Additional types of deployment functions are described throughout this disclosure.

The technologies described herein provide a variety of benefits and advantages. Amongst other things, the decentralized computing techniques enable rapid and efficient processing of data collected over multiple geographic areas. This can be attributed, at least in part, to the decentralization of nodes that act independently to collect and process information for specific channels, rather than relying on a central authority to aggregate and analyze the data across multiple geographic areas. Another benefit of the centralized computing techniques relates to increases the reliability of the system. In the event that one of the nodes fail, the other nodes can continue to function independently. Additionally, the failed node easily can be replicated and reinitialized to minimize downtime. Another benefit relates to the ease of scaling of the system, such as to accommodate new geographic areas and/or enhanced functionality. When geographic scaling is desired, additional nodes can easily be incorporated into the geographical hierarchy without having to modify the functionality of a central authority. Likewise, when enhanced functionality is desired, additional computing and storage resources can easily be allocated to existing nodes.

Further benefits can be attributed to the usefulness and versatility of the channel analysis data, which can be leveraged for many different purposes. This data can provide merchant entities with real-time and/or predictive metrics that can assist merchant entities with accommodating surges in supply and demand (and/or population surges within a channel). In some cases, the channel analysis data also can be integrated with pricing and/or inventory systems to seamlessly adjust pricing and/or inventory allocations in real-time or near real-time.

Additional benefits can be attributed to embodiments that utilize the channel analysis data to automated surge pricing functions. Client applications that employ surge pricing functionalities can better mitigate imbalances between an available supply of inventory items and a demand for those inventory items. The channel analysis can be leveraged to dynamically adjust prices for the inventory items, thereby enabling providers of the client applications to reduce high-demand peaks.

The technologies discussed herein can be used in a variety of different contexts and environments. Some useful applications of these technologies are in the context of adjusting pricing and/or inventory allocations for merchant entities, such as those that provide ride hailing services, hotel accommodations, parking garages, bar and restaurant establishments, etc. For example, the technologies disclosed herein can provide merchant-specific insights and metrics regarding the current and future demand for products and services offered by these entities. These metrics can be used by those entities to automatically or manually adjust settings for pricing systems (e.g., surge pricing systems), inventory systems, and/or other operations.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Figure 1B:
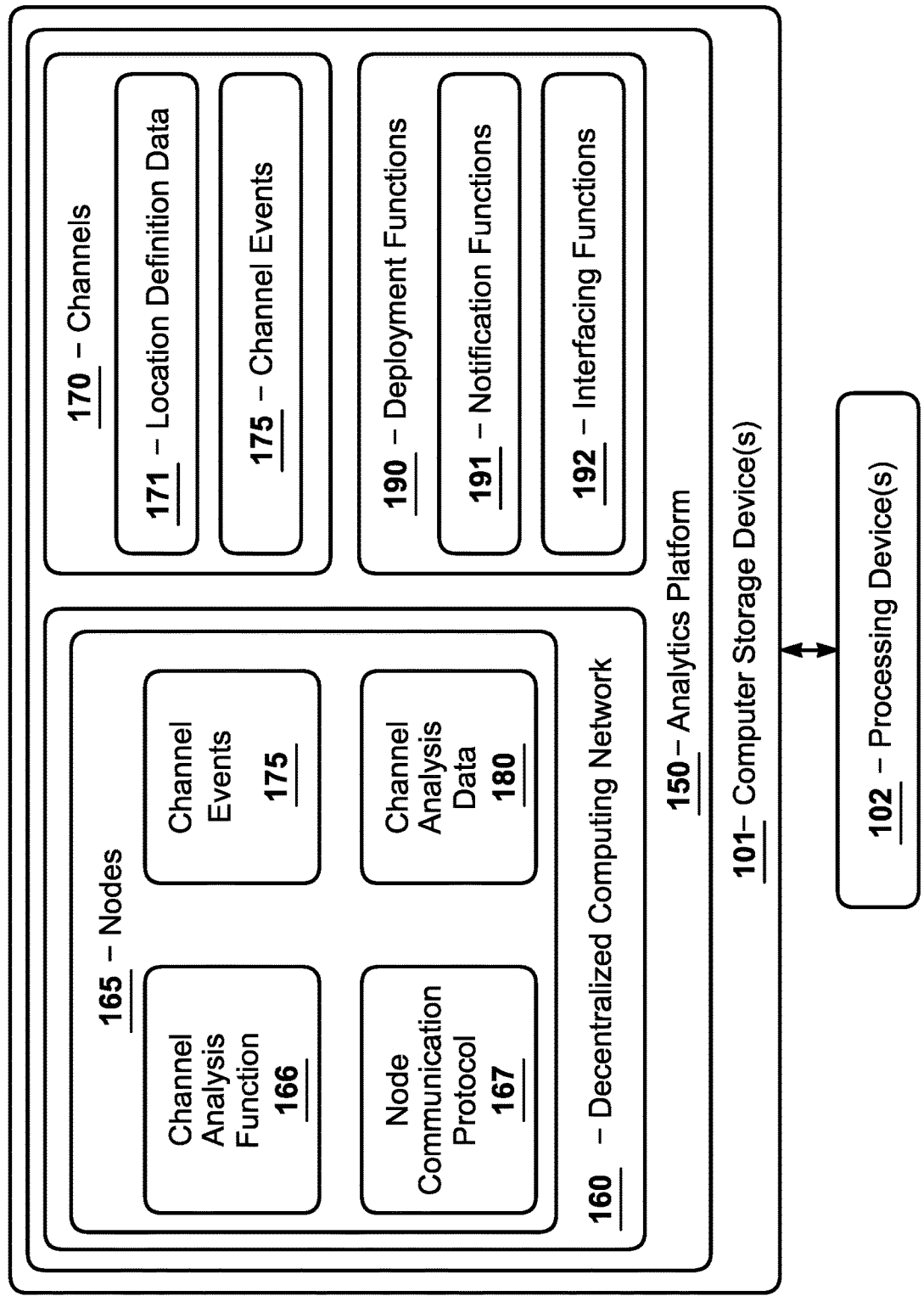
FIG. 1B is a block diagram illustrating exemplary features of surge analytics platform according to certain embodiments.

FIG. 1A is a diagram of an exemplary system 100 in accordance with certain embodiments. The system 100 includes, inter alia, an analytics platform 150 that utilizes a decentralized computing network 160 to generate or derive channel analysis data 180 for a plurality of channels 170. FIG. 1B is a diagram illustrating additional features, components, and/or functions associated with the analytics platform 150 and decentralized computing network 160. FIGS. 1A and 1B are jointly discussed below.

The system 100 comprises one or more computing devices 110, one or more servers 120, one or more external data sources 130, and one or more client systems 140 that are in communication over a network 105. An analytics platform 150 comprising a decentralized computing network 160 is stored on, and executed by, the one or more servers 120. The network 105 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 1A, including the one or more computing devices 110, one or more servers 120, one or more external data sources 130, and one or more client systems 140, and analytics platform 150 can be configured to communicate directly with each other and/or over the network 105 via wired or wireless communication links, or a combination of the two. Each of the computing devices 110, servers 120, external data sources 130, client systems 140, and analytics platform 150 can include one or more communication devices, one or more computer storage devices 101, and one or more processing devices 102 (FIG. 1B) that are capable of executing computer program instructions.

The one or more computer storage devices 101 may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the one or more computing storage devices 101 may be physical, non-transitory mediums. The one or more computer storage devices 101 can store, inter alia, instructions associated the implementing the functionalities of the analytics platform 150 and decentralized computing network 160 described herein.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 102 can be configured to execute any computer program instructions that are stored or included on the one or more computer storage devices 101 including, but not limited to, instructions associated the implementing the functionalities of the analytics platform 150 and decentralized computing network 160 described throughout this disclosure.

Each of the one or more communication devices can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices additionally, or alternatively, can include one or more modem devices, one or more router devices, one or more access points, and/or one or more mobile hot spots. For example, modem devices may enable some or all of the computing devices 110, servers 120, external data sources 130, client systems 140, and/or analytics platform 150 to be connected to the Internet and/or other network. The modem devices can permit bi-directional communication between the Internet (and/or other network) and the computing devices 110, servers 120, external data sources 130, client systems 140, and/or analytics platform 150. In certain embodiments, one or more router devices and/or access points may enable the computing devices 110, servers 120, external data sources 130, client systems 140, and/or analytics platform 150 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 110, servers 120, external data sources 130, client systems 140, and/or analytics platform 150 to access the Internet and/or other networks.

In certain embodiments, the computing devices 110 may represent desktop computers, laptop computers, mobile devices (e.g., smart phones, personal digital assistants, tablet devices, vehicular computing devices, wearable devices, or any other device that is mobile in nature), and/or other types of devices. The one or more servers 120 may generally represent any type of computing device, including any of the aforementioned computing devices 110. The one or more servers 120 also can comprise one or more mainframe computing devices and/or one or more virtual servers that are executed in a cloud-computing environment. In some embodiments, the one or more servers 120 can be configured to execute web servers and can communicate with the computing devices 110, external data sources 130, client systems 140, and/or other devices over the network 105 (e.g., over the Internet).

In certain embodiments, the analytics platform 150 can be stored on, and executed by, the one or more servers 120. Additionally, or alternatively, the analytics platform 150 can be stored on, and executed by, the one or more computing devices 110 and/or one or more client systems 140. The analytics platform 150 can be executed be stored on, and executed, by other devices as well.

In some embodiments, the analytics platform 150 also can be stored as a local application on a computing device 110, or interfaced with a local application stored on a computing device 110, to implement the techniques and functions described herein. The computing device 110 may be part of client system 140 in some scenarios.

The client systems 140 can generally correspond to third-party systems, networks, and/or devices that access the analytics platform 150 and/or utilize the data (including the channel analysis data 180) generated by the analytics platform 150. For example, the client systems 140 can be operated and managed by individuals, businesses, and/or other entities that utilize the analytics platform 150 (including the channel analysis data 180 generated by the analytics platform 150) to improve the functionalities of one or more systems and/or one or more applications.

In certain embodiments, each of the client systems 150 can register and/or create a user account with the analytics platform 150 to obtain access to the data and services provided by the analytics platform 150. The client systems 180 can be operated by, or associated with, individuals or businesses from any industry or vertical including, but not limited, to those that offer ride hailing services, hotel or lodging accommodations, parking space availability, tavern services, and restaurant services. As explained in further detail below, the client systems 180 can utilize the channel analysis data 180 (and other data provided by the analytics platform 150) to enhance and improve business operations in various ways.

Each of the client systems 140 may include one or more computing devices 110 that enable the client systems 140 to access the analytics platform 150 over the network 105. In some cases, one or more of the client systems 140 may include sophisticated technological infrastructures, such those that include enterprise systems, servers 120, virtual private networks (VPNs), intranets, etc. The computing devices 110, servers 120, and/or other devices associated with each client system 140 can store and execute various applications (e.g., such as ride hailing applications, lodging booking applications, dining reservation applications, pricing applications, inventory management applications, etc.). The client systems 140 and associated applications can leverage the data (e.g., channel analysis data 180) provided by the analytics platform 150 in various ways.

In certain embodiments, the analytics platform 150 can be integrated with (or can communicate with) various applications hosted by the client systems 140 including, but not limited to, applications that provide products or services for transportation services (e.g., ride hailing services, ride sharing services, vehicle rental services, and/or ticket scheduling services for buses, trains, planes, boats, and/or other modes of transportation), lodging accommodations (e.g., booking services for hotels, motels, short-term home stays, rental services, property purchases, etc.), parking space services (e.g., booking services for parking garages, parking lots, etc.), and scheduling services (e.g., reservation services for restaurants, bars, sporting events, concerts, ticketed events, etc.). In certain embodiments, the analytics platform 150 additionally, or alternatively, can be integrated with (or can communicate with) e-commerce applications, pricing applications, inventory management applications, and/or other applications.

The aforementioned applications and/or other applications, each of which may be integrated or interfaced with the analytics platform 150, can be stored on one or more client systems 140 in some embodiments. For example, the aforementioned applications and/or other applications can stored be stored on one or more computing device 110 and/or one or more servers 120 associated with one or more client systems 140.

As discussed throughout this disclosure, the analytics platform 150 can generally provide functions associated with analyzing conditions associated with activities, individuals, events, and/or like within a plurality of channels 170. This analysis can be used to generate channel analysis data 180 corresponding to each of the channels 170. The channel analysis data 180 for a given channel 170 can include various metrics and information useful for understanding and/or predicting the conditions within the channel 170. For example, the channel analysis data 180 for a channel 170 can include information that indicates and/or predicts population surges within the channel 170, movements of individuals within the channel, and/or supply and demand for inventory (e.g., products or services) within the channel 170. Additionally, as described in further detail below, the analytics platform 150 can utilize the channel analysis data 180 to implement a surge pricing function and/or inventory management function on a variety of client applications.

Each channel 170 can represent, or correspond to, a specific geographic region or area. The scope or region associated with each channel 170 can vary significantly. For example, macro-level channels 170 can correspond to large geographic areas covering entire continents, countries, and/or states. Other more micro-level channels 170 can correspond to counties, cities, and/or towns. Additional channels 170 can correspond to specific regions, neighborhoods, areas, or the like within cities or towns. Regardless of geographic scope, a node 165 included in the decentralized computing network 160 can be associated with each channel 170 to process data associated with the channel 170 and generate channel analysis data 180 for the channel 170.

The nodes 165 and/or analytics system 150 can store location definition data 171 that defines the geographic region associated with each channel 170. For example, in certain embodiments, the location definition data 171 can store global positioning system (GPS) coordinates for each channel 170 that precisely defines the geographic region associated with the channel 170. Additionally, or alternatively, the location definition data 171 can include geofencing data that defines the geographic region associated with the channel 170. In some embodiments, the analytics platform 150 can provide access to one or more GUIs that enable users to define the geographic regions associated with the channels 170.

The analytics platform 150 can include, or communicate with, a decentralized computing network 160 that is configured to generate some or all of the channel analysis data 180 for the channels 170. The decentralized computing network 160 can comprise a plurality of nodes 165, each of which is configured to execute a channel analysis function 166 that independently processes information associated with a dedicated channel 170 and generates corresponding channel analysis data 180 for that channel 170.

Each node 175 in the decentralized computing network 160 can be dedicated to a particular channel 170 and can receive channel events 175 associated with the channel 170. These channel events 175 can be analyzed and/or utilized by the channel analysis function 166 to generate the channel analysis data 180 for the channel 170.

Each node 175 of the decentralized computing network 160 can utilize dedicated processing and/or storage resources to process the channel events 175 and generate the channel analysis data 180 for a corresponding channel 170. In certain embodiments, the decentralized computing network 160 can be provided via a cloud-based computing environment that executes a separate virtual machine for each node 165. Alternatively, or additionally, one or more hardware servers (or other computing devices) can be dedicated to each node 165.

Because the nodes 165 can be configured to separately and independently process data associated each channel 170, each node 165 only processes the data corresponding to its designated channel 170 and does not need to process the global data across all channels 170. This decentralized configuration can enable rapid and efficient processing of data collected over multiple geographic areas, and can significantly decrease latencies across the network. The configuration can be particularly beneficial in scenarios in which the analytics platform 150 is collecting and analyzing information over large geographic areas. Additionally, the independent processing of data by the nodes 165 provides more reliability and drastically reduces the chances of a catastrophic system failure in which the entirety of the systems becomes unavailable. Additional details and exemplary configurations of decentralized computing networks 160 are described below with reference to FIGS. 2A and B.

The types and content of the channel events 175 received and processed by each node 165 can vary. The channel events 175 can generally include any data associated with monitoring locations of individuals within a channel 170, activities occurring within the channel 1701, and/or other conditions associated with the channel 170. For example, the channel events 175 received by a node 165 can include data indicating locations of individuals (or their smart phones or mobile devices) within the channel 170, transactions conducted within the channel 170, weather conditions within the channel, and/or events (e.g., concerts, conventions, etc.) occurring within the channel 170.

The channel events 175 can be generated by, or received from, various devices, systems, and/or sources. Some of the channel events 175 can be generated by computing devices 110 (e.g., mobile devices, smart phones, wearable devices, etc.) operated by individuals within the channels 170. For example, these devices (or applications installed thereon) can generate channel events 175 indicating locations of the devices, transactions conducted using the devices, and/or other information.

Additional channel events 175 can be received one or more external data sources 130, which can include third-party websites, databases, and/or servers that provide information relating to the channels 170 and/or individuals located within the channels 170. Exemplary external data sources 130 can include websites, databases, and/or servers associated with cellular device providers, weather outlets, news outlets, social media sites, and/or the like. In some embodiments, these and other external data sources 130 be used to derive or generate channel events 175 relating to weather conditions within the channels 170, events occurring with the channel, locations of individuals within the channels, etc.

Figure 5B:
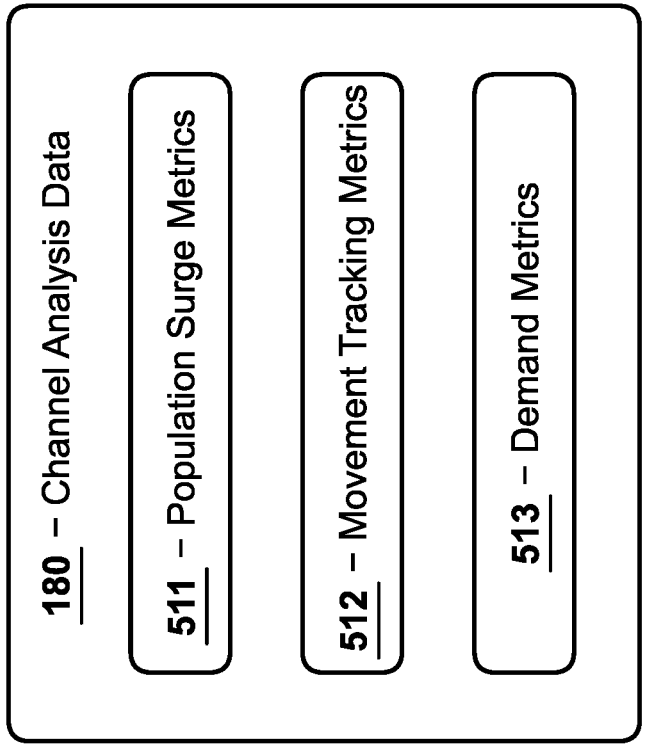
FIG. 5B is a block diagram illustrating exemplary channel analysis data according to certain embodiments.
Figure 5A:
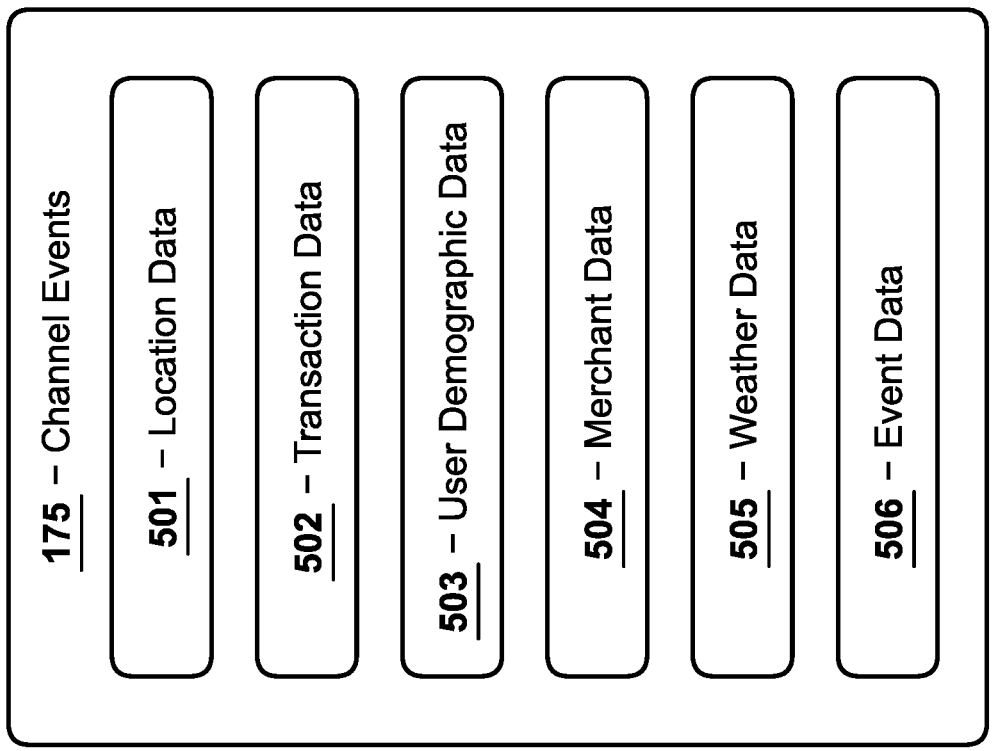
FIG. 5A is a block diagram illustrating exemplary channel events according to certain embodiments.

FIG. 5A is block diagram illustrating examples of channel events 175 that can be received by each of the nodes 165. As shown, the channel events 175 can include, inter alia, location data 501, transaction data 502, user demographic data 503, merchant data 504, weather data 505, and event data 506.

The location data 501 received by each node 165 can indicate the current locations and/or historical locations and movements of individuals (or computing devices 110 operated by individuals) located in a channel 170 associated with the node 165. For example, the location data 501 may include GPS coordinates indicating the current locations of individuals, and previous locations of those individuals. In some embodiments, the location data 501 can be received directly from computing devices 110 operated by the individuals and/or an external data source 130, such as a cellular service provider.

The transaction data 502 received by each node 165 can indicate purchases that are made within a channel 170 associated with the node 165 and/or purchases made by individuals that are currently located within the channel 170. The transaction data 502 also may indicate transaction patterns or profiles for each of the individuals located in the channel 170 (e.g., indicating the types of products or services routinely purchased by the individual and/or the types of businesses routinely frequented by the individual). In some cases, the transaction 502 data also may indicate the channel 170 where each transaction was conducted. In some embodiments, the transaction data 502 can be received directly from computing devices 110 operated by the individuals and/or an external data source 130, such as a third-party merchant system, credit card service provider, digital payments provider, etc.

The demographic information 503 received by each node 165 can include various characteristics or attributes relating to individuals within a corresponding channel 170 associated with the node 165. For example, the user demographic data 503 for each individual can indicate some or all of the following: age, sex, race, ethnicity, income, marital status, occupation, education level, interests, etc. In some embodiments, the demographic information 503 can be received directly from computing devices 110 operated by the individuals and/or an external data source 130, such as a social media sites, marketing or advertising services, etc.

The merchant data 504 received by each node 165 can provide information related to merchants (e.g., businesses, vendors, etc.) located in a channel 170 associated with the node 165. For example, the merchant data 504 may identify the locations of the merchants, the vertical associated with the merchants, hours of operation, and products or services offered by the merchants. In some embodiments, the merchant data 504 can be received directly from computing devices 110 operated by the merchants and/or an external data source 130, such as a crowd-sourced business review applications, business information databases, etc.

The weather data 505 received by each node 165 can indicate the current weather conditions and/or historical weather conditions in a channel 170 associated with the node 165. The weather data 505 also may indicate forecasts of future weather conditions for the channel 170. In some embodiments, the weather data 505 can be received from one or more external data sources 130, such as those that provide weather forecasting services.

The event data 505 received by each node 165 can provide information associated with events (e.g., concerts, conventions, seminars, shows, etc.) in the channel 170. The event data 505 can include information identifying ongoing events, as well as previously held or upcoming events. The event data 505 may include dates and times associated with each of the events 505. In some embodiments, the event data 505 can be received directly from computing devices 110 operated by event providers and/or an external data source 130, such as a social media sites, community bulletin board sites, etc.

The categories identified in FIG. 5A are intended to provide examples of content that may be included in channel events 175 received by each node 165 of the decentralized computing network 160. However, it should be recognized that the channel events 175 received by each node 165 can include additional information or data related to the activities, individuals, entities, and/or conditions of a channel 170.

Returning to FIGS. 1A and 1B, the channel events 175 associated with a channel 170 can be received by a node 165 dedicated or assigned to that channel 170. The node 165 can execute a channel analysis function 166 to analyze the channel events 175, and generate channel analysis data 180 for the channel 170. The channel analysis data 180 can include various types of metrics or data useful for understanding the conditions associated with the channel 170. In many scenarios, the channel analysis data 180 can include real-time information regarding the current channel conditions and/or predictions related to future channel conditions.

FIG. 5B is a block diagram illustrating examples of channel analysis data 180 that can be generated by each node 165. In some embodiments, the channel analysis function 166 executed by each node 165 may generate channel analysis data 180 that includes population surge metrics 511, movement tracking metrics 512, and demand metrics 513.

The population surge metrics 511 generated by each node 165 can detect occurrences or situations in which the number of individuals located within a channel 170 (or certain regions in the channel 170) significantly increases and/or decreases. In some embodiments, the population surge metrics 511 can include data that identifies densities of individuals throughout a channel 170. For example, the population surge metrics 511 can indicate regions within the channel 170 where there is a high density of individuals and/or regions within the channel where there are lower densities of individuals. In some cases, the population surge metrics 511 for a channel 511 can be generated, at least in part, by monitoring locations (e.g., GPS coordinates) of individuals' computing devices 110 (e.g., smart phones or mobile devices), determining the number of computing devices 110 that are located within the channel 170 (or region within the channel), and comparing that number to a value indicating an average or baseline population for the channel 170 (or region within the channel).

Each node 165 also can be configured to predict future channel conditions in which the population in the channel 170 will vary from the average or baseline population. These predictions can be generated based, at least in part, on an analysis of the channel events 175. For example, the event data 506 included in the channel events 175 can be utilized to identify times and locations in which a population surge is likely to occur in the channel 170 (or regions within the channel 170) as the result of an upcoming event (e.g., such as a concert). Additionally, or alternatively, the location data 501 included in the channel events 175 can be used to predict upcoming expansions or retractions of populations within a channel 170 (or regions within a channel 170) based on an analysis of individuals' current locations and/or based on historical movement patterns. Additionally, or alternatively, the weather data 505 included in the channel events 175 also may be utilized to predict the population surge metrics 511 based on expected weather conditions for future time periods.

The movement tracking metrics 512 generated by each node 165 can include various metrics indicating and/or predicting the locations or movements of individuals within the channel 170 associated with the node 165. The movement tracking metrics 512 can include data indicating where individuals have moved within the channel, and locations where those individuals originated. The movement tracking metrics 512 also include data that indicates movement or migration patterns of individuals (both intra-channel movement patterns and inter-channel movement patterns). For example, based on an analysis of historical location data 501, the movement tracking metrics 512 may indicate historical movement patterns of individuals within the channel 170.

The movement tracking metrics 512 also can include data that predicts the movements of individuals throughout a channel 170 in a future time period. For example, the movement tracking metrics 512 can predict regions within a channel where individuals are likely like to migrate. The location tracking metrics 512 can be generated based, at least in part, on the channel events 175 (e.g., such as the location data 501 indicating current and historical locations of individuals, and event data 506 indicating current or upcoming events within the channel 170).

The demand metrics 513 generated by each node 165 can include various metrics indicating and/or predicting supply and/or demand within the channel 170 for various inventory items (e.g., products and/or services) in one more verticals (e.g., riding sharing, hotel accommodations, parking garages, restaurants, bars, retail, etc.). The current or future supply and/or demand for inventory may be determined based, at least in part, on an analysis of the population surge metrics 511 (e.g., which can indicate or predict the densities of individuals within the channel 170 or regions within the channel 170). Additionally, or alternatively, the supply and/or demand for inventory also may be based on an analysis of channel events 175 received by the node 165, such as channel events that include transaction data 502 (e.g., which may indicate recent or historical purchases made within the channel 170), weather data 505 (e.g., which may indicate weather conditions affecting the demand for inventory), merchant data 504 (e.g., which may indicate the supply of inventory in the channel 170), and/or other channel events 175.

The population surge metrics 511, movement tracking metrics 512, and demand metrics 513 are provided as examples of channel analysis data 180 that can be generated by a node 165. However, it should be recognized that the channel analysis data 180 can include many other types of metrics or analytics relevant to the conditions of the channels 170.

Returning to FIGS. 1A and 1B, the one or more computing devices 110 can enable individuals to access the analytics platform 150 over the network 105 (e.g., over the Internet via a web browser application). For example, after a user account is established with the analytics platform 150, a user may utilize the analytics platform 150 to access to channel analysis data 180 generated by the analytics platform 180. In some embodiments, a user may be provided with access to the channel analysis data 180 generated across all of the channels 170. In other embodiments, a user may designate particular channels 170 of interest and receive channel analysis data 180 from the designated channels 170. In some embodiments, a user also may designate particular verticals or industries of interest, and receive channel analysis data 180 pertaining specifically to those verticals or industries.

The analytics platform 150 may generate various graphical user interfaces (GUIs) that display the channel analysis data 180 and/or other associated data (e.g., channel event information, user account profiles, etc.), and these interfaces can be accessed via the user accounts. The interfaces provided by the analytics platform 150 also can include selectable options for configuring one or more deployment functions 190. The deployment functions 190 can permit users to leverage the channel analysis data 180 (and other data generated by the analytics platform 150) for various purposes.

One exemplary deployment function 190 can include a notification function 191. The notification function 191 enables users to configure the transmission of notifications in various scenarios. The notifications can be transmitted in various ways (e.g., via e-mail, cellular text messages, inbox messages on user accounts, data presented on GUIs, etc.) and the notifications can be sent to various devices (e.g., client systems 140, mobile or computing devices operated by individuals located in a channel 170, etc.).

In some cases, the notification function 191 can be configured to periodically transmit notifications that include channel analysis data 180, including both real-time and predictive channel analysis data 180. In this scenario, the notifications may provide daily, weekly, monthly and/or annual summaries of channel analysis data 160 relevant to specific users. The notification function 191 also can be configured to send notifications in response to trigger events that are defined or configured by users. In this scenario, users may specify or define triggering criteria, and the analytics platform 150 may automatically send notifications to computing devices 110 and/or client systems 140 when specific trigger events are detected or predicted by the analytics platform 150 (e.g., in response to detecting or predicting a surge in population within the channel and/or a surge in demand for inventory). The notification function 191 also can be configured to send notifications to individuals (e.g., their mobile devices) located within a channel 170. In this scenario, the notifications can include information about merchants located in a channel 170 and, in some cases, can include offers and discounts for various products and services.

Another exemplary deployment function 190 can include an interfacing function 192. The interfacing function 192 can permit a user to interface the analytics platform 150 with various external applications and/or systems, thereby enabling those applications and/or systems to receive and utilize the channel analysis data 180 generated by the analytics platform 150.

In some embodiments, one or more of applications running on, or operated by, the client systems 140 can be directly interfaced with the analytics platform 150 (e.g., via an application programming interface or API provided by the analytics platform 150). In some exemplary scenarios, an client system 140 may execute or provide a ride hailing application, a lodging booking application (e.g., hotel booking application), a dining reservation application (e.g., an application for scheduling dining reservations), a ticket booking application (e.g., for purchasing tickets to concerts, sporting games, and/or other events), a pricing application (e.g., an program that computes or determines prices for products and/or services), a staffing application (e.g., a program that schedules employees), and/or an inventory management application (e.g., a program that allocates inventory among different channels 170 or locations, places orders for new inventory, etc.). The interfacing function 192 can connect the analytics system 150 to these applications (and other types of applications), thereby enabling the applications to directly receive the channel analysis data 180 and utilize the channel analysis data 180 to automate control of one or more functions (e.g., such as determining or adjusting pricing information, adjusting inventory allocations, initiating purchases of additional inventory, adjusting staffing at locations, etc.).

In one example, the deployment functions 190 can be utilized to implement surge pricing functions, which change or adjust the prices of products and/or services based on a supply or demand for those products and/or services. For example, the population surge metrics 511 and/or demand metrics 511 included in the channel analysis data 180 for a channel 170 can be used to dynamically adjust the pricing for hotel rooms, ride hailing services, parking garage spaces, and/or other types of inventory based on the demand for the inventory within the channel 170. Similarly, the movement tracking metrics 512 can be utilized to detect particular regions within a channel 170 where demand is likely to be higher and to adjust prices accordingly. These surge pricing functions can be automated by interfacing client systems 140 with the analytics platform 150 (e.g., via the interfacing function 192) and/or they can be perform manually based on a review of the channel analysis information 180.

In another example, the deployment functions 190 can be utilized by client systems 140 to reallocate inventory or resources based on the channel analysis data 180. For example, a client system 140 that provides ride-sharing services can reallocate drivers to regions or areas where demand is higher and/or expected to be higher. Along similar lines, a client system 140 that is affiliated with a restaurant within a channel 170 can place orders for additional inventory and/or adjusting staffing in scenarios where demand is higher and/or expected to be higher. The channel analysis data and deployment functions 190 can be utilized in many others ways to enhance operations of merchants within the channels 170.

FIG. 2A illustrates an exemplary decentralized computing network 160 comprising a plurality of nodes 165 arranged in a geographical hierarchy 210. In some embodiments, the geographical hierarchy 210 comprises a plurality of layers (such as exemplary layers A, B, C, D . . . N), and each of the layers can include one or more nodes 165. In general, the nodes 165 located in the upper layers of the geographical hierarchy 210 encompass broader channels 170 or geographic areas than those included in lower layers.

To illustrate by way of example, Layer A may include a global node 165 that corresponds to a global channel (e.g., channel 170A), which encompasses all geographic regions that are analyzed by the analytics platform 150. Layer B can include a plurality of nodes 165 that correspond to country-level channels (e.g., such as channel 170B), each of which encompasses a geographic region associated with a particular country. Layer C can include a plurality of nodes 165 that correspond to state-level channels (e.g., such as channel 170C), each of which encompasses a geographic region associated with a particular state, province, district or similar type of region within a country. Layer D can include a plurality of nodes that correspond to city-level channels (e.g., such as channel 170D), each of which encompasses a geographic region associated with a particular city, town, village, or the like. Layer E can include a plurality of nodes that correspond to even more granular channels (e.g., such as channel 170E), each of which encompasses a geographic region (e.g., a neighborhood or area) within a particular city, town, village, or the like.

Parent-child relationships 220 can be established among related nodes 365 in the geographical hierarchy 210. A child node can represent a channel 170 (or geographic region) that is a subset of a channel 170 associated with a parent node. Conversely, a parent node can represent a channel 170 (or geographic region) that is a superset of one or more channels 170 associated with child nodes. Thus, each node may be connected to parent node in an upper layer if that node is a subset of the node in the upper layer, and each node can be connected to one or more child nodes in a lower layer if that node is a superset of the nodes in the lower layer.

For example, a first node in Layer C can be associated with a channel covering the state of New York. Therefore, this node can be connected to a parent node in Layer B that corresponds to a channel covering the United States, and can be connected to a plurality of child nodes in Layer D corresponding to cities in the state of New York (e.g., New York City, Buffalo, Rochester, etc.). Similarly, a second node in Layer C may correspond to a channel covering the province of British Columbia. This node can be connected to a parent node in Layer B that corresponds to a channel encompassing the country of Canada, and can be connected a plurality of child nodes in Layer D corresponding to cities in the province of British Columbia. Along similar lines, the nodes in Layer E can correspond to specific regions (e.g., blocks, neighborhoods, boroughs, etc.) within particular cities, and can be connected to corresponding nodes in Layer D.

A node communication protocol 167 (FIG. 1B) can enable communication among the nodes 165 in the decentralized computing network 160 based on the parent-child relationships 220 among the nodes. For example, a given node can exchange information with one or more parent nodes and/or one or more child nodes based on geographical associations or relationships. The exchange of information among the nodes can be used, at least in part, to generate the channel analysis data 180 across the nodes 165 in a manner that avoids redundancies and reduces storage and processing requirements.

To illustrate by way of example, consider a scenario in which a node 165 in Layer C (e.g., corresponding to a channel 170 for the State of New York) is computing demand metrics 513 that indicate or predict the demand for one or more products or services in the channel 170. In this scenario, the node communication protocol 167 enables the node in Layer C to communicate with and receive demand metrics 513 generated by the nodes in Layer D (e.g., that can correspond to channels for cities within the State of New York). The node in Layer C can compute the demand metrics 513 for its channel 170, at least in part, using the demand metrics received from the nodes in Layer D. Along similar lines, the nodes in Layer D can compute demand metrics 513 for corresponding channels 170 using the demand metrics 513 that were computed by corresponding child nodes in Layer E.

In this manner, the nodes 165 are able to leverage the data generated by the related nodes and avoid processing the data associated with those nodes, thereby avoiding redundancies in computations. The node communication protocol 167 can enable the nodes to leverage the parent-child relationships 220 to compute other metrics included with the channel analysis data 180 (e.g., such as population surge metrics 511, movement tracking metrics 512, and/or other metrics described herein).

Additionally, in some embodiments, the node communication protocol 167 can include or utilize a blockchain protocol to record and track communications among the nodes 165 of the decentralized computing network 160. For example, each of the nodes 165 can store and maintain a distributed ledger or database that records the data exchanged among the nodes 165 (e.g., which may include channel analysis information 180 and/or channel events 175). The distributed ledger or database can be updated with a new block or entry each time data from one node 165 is passed to another node 165, and the block or entry can be appended with various attributes (e.g., data indicating the node receiving information, the node sending information, the information that was exchanged, the date/time of exchange, etc.). In some scenarios, a consensus mechanism or protocol may be utilized to approve the addition of new blocks to the distributed ledger or database and/or to ensure a single, valid copy of the distributed ledger or database is shared by all of the nodes 165.

For ease of understanding, the examples discussed above (and in other portions of this disclosure) describe geographical hierarchies 210 or channels 170 that are based on political boundaries, such as those corresponding to countries, states, cities, etc. However, it should be recognized that the geographical hierarchies 210 and channels 170 can be defined in many other ways that are not associated with political boundaries. For example, the channels 170 associated with the nodes 165 can correspond to arbitrarily selected geographic regions that are not tied to political boundaries and/or can correspond to geographic regions that are selected based on longitude and latitude coordinates.

Figure 2B:
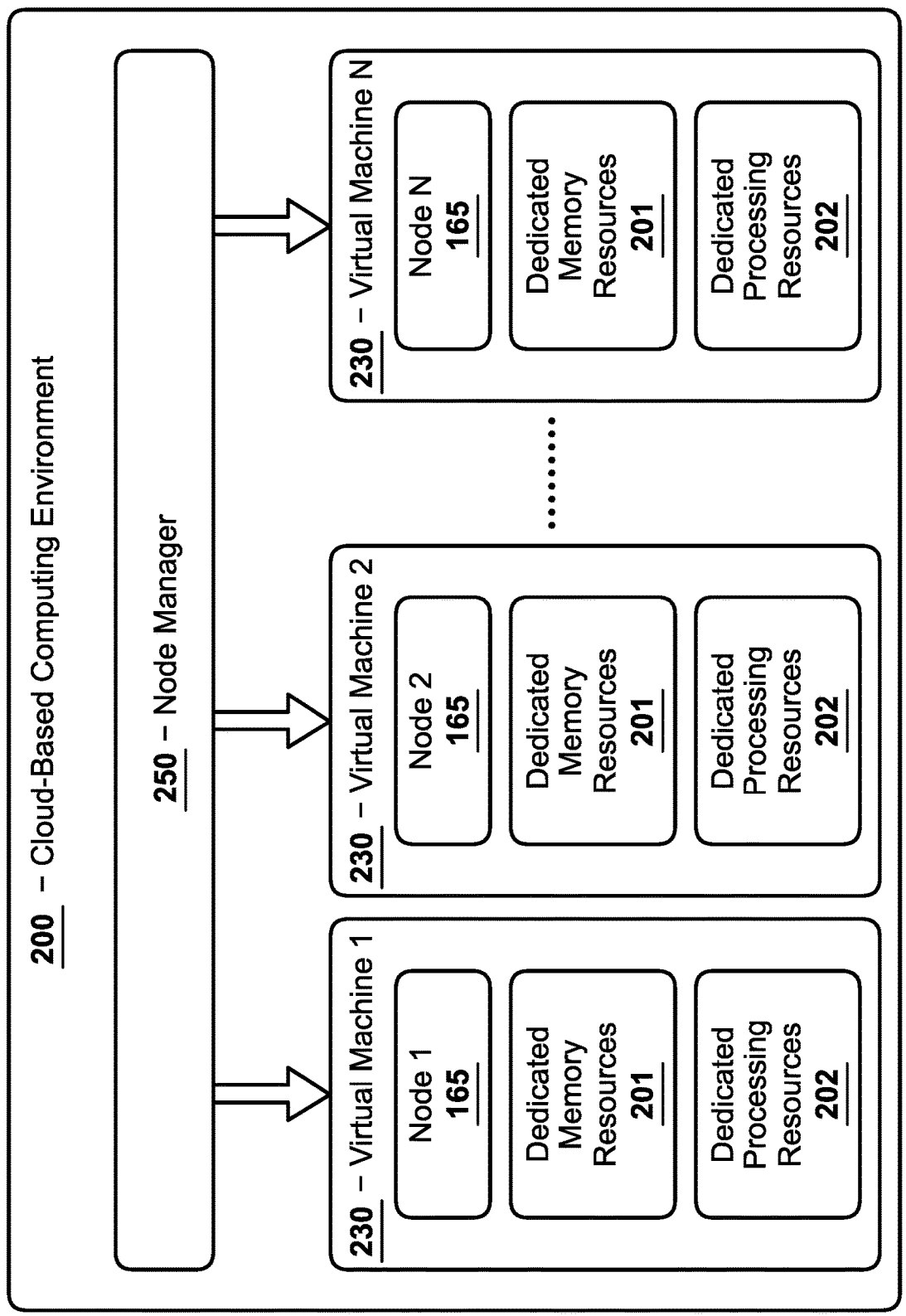
FIG. 2B is a block diagram illustrating a cloud-based computing environment for a decentralized computing network according to certain embodiments.

FIG. 2B illustrates an exemplary cloud-based computing environment 200 that is configured to host and/or implement the decentralized computing network 160. In certain embodiments, the cloud-based computing environment 200 can include a plurality of servers (e.g., such as servers 120) that provide, inter alia, a shared pool of processing, memory, and/or storage resources.

In this exemplary environment, each of the nodes 165 included in the decentralized computing network 160 can be executed on a separate virtual machine (VM) 230 (e.g., such as virtual machines 1, 2, . . . N). Each of the virtual machines 230 can utilize dedicated memory resources 201 and dedicated processing resources 202 to execute the functionalities associated with a corresponding node 165. The dedicated memory resources 201 can include one or more computer storage devices (e.g., such as computer storage devices 101) selected from a shared pool of server resources. The dedicated processing resources 202 can include one or more processing devices (e.g., such as processing devices 102) selected from a shared pool of server resources.

In certain embodiments, each of the virtual machines 230 can represent a process virtual machine (also referred to as an application virtual machine) that executes the functions associated with a node 165, including receiving channel events 175, executing the channel analysis function 166, and generating channel analysis information 180. As explained above, a node communication protocol 167 enables the nodes 165 (and corresponding virtual machines 230) to communicate with each other for generating channel analysis data 180.

The node manager 250 can operate as a virtual machine manager (VMM) and/or hypervisor that manages the creation and execution of the virtual machines 230 in the cloud-based computing environment 200. Additionally, or alternatively, the node manager 250 can perform functions associated with allocating or assigning the nodes 165 to the virtual machines 230.

The node manager 250 also can perform operations associated with allocating resources (e.g., dedicated memory resources 201, dedicated processing resources 202, storage resources, etc.), to each of the virtual machines 230 and/or to each of the nodes 165 associated with the virtual machines 230. In some instances, the node manager 250 can monitor the workloads associated with each of the nodes 165 and dynamically adjust or allocate memory resources 201 and processing resources 202 to the nodes 165 (or virtual machines 230 executing the nodes 165) based on the workloads of the nodes 165. For example, in scenarios in which a node 165 has a large workload (e.g., because it is required to process data for large populations of individuals), the node manager 250 can allocate additional memory resources 201 and processing resources 202 to the node 165

In certain embodiments, the node manager 250 also can perform operations that allocate nodes 165 to the virtual machines 230 in the cloud-based computing environment 200. In some instances, the node manager 250 may allocate one node to each of the virtual machines 230. In other instances, the node manager 250 may allocate a plurality of nodes to some or all of the virtual machines 230.

Additionally, the node manager 250 can perform operations that associate nodes 165 with the channels 170. In some embodiments, the node manager 250 can associate one node 170 with each of the channels 170 and, in other instances, the node manager 250 can allocate a plurality of nodes 165 to each of the channels 170 or some of the channels 170. For example, in scenarios where the workload of node 165 is high, the node manager 250 can allocate additional nodes 165 to help process the workload for a corresponding channel 170.

The decentralized computing network 160 can be implemented in other environments and configurations. For example, the decentralized computing network 160 can be implemented in alternative cloud-based computing environments and configurations. Additionally, the decentralized computing network 160 can be implemented without the usage of any cloud-based computing environment. For example, in some embodiments, a plurality of hardware servers, each of which is dedicated to execute the functionality of a corresponding node 165, can be utilized to implement the decentralized computing network 160. The decentralized computing network 160 can be implemented in other ways as well.

Figure 3:
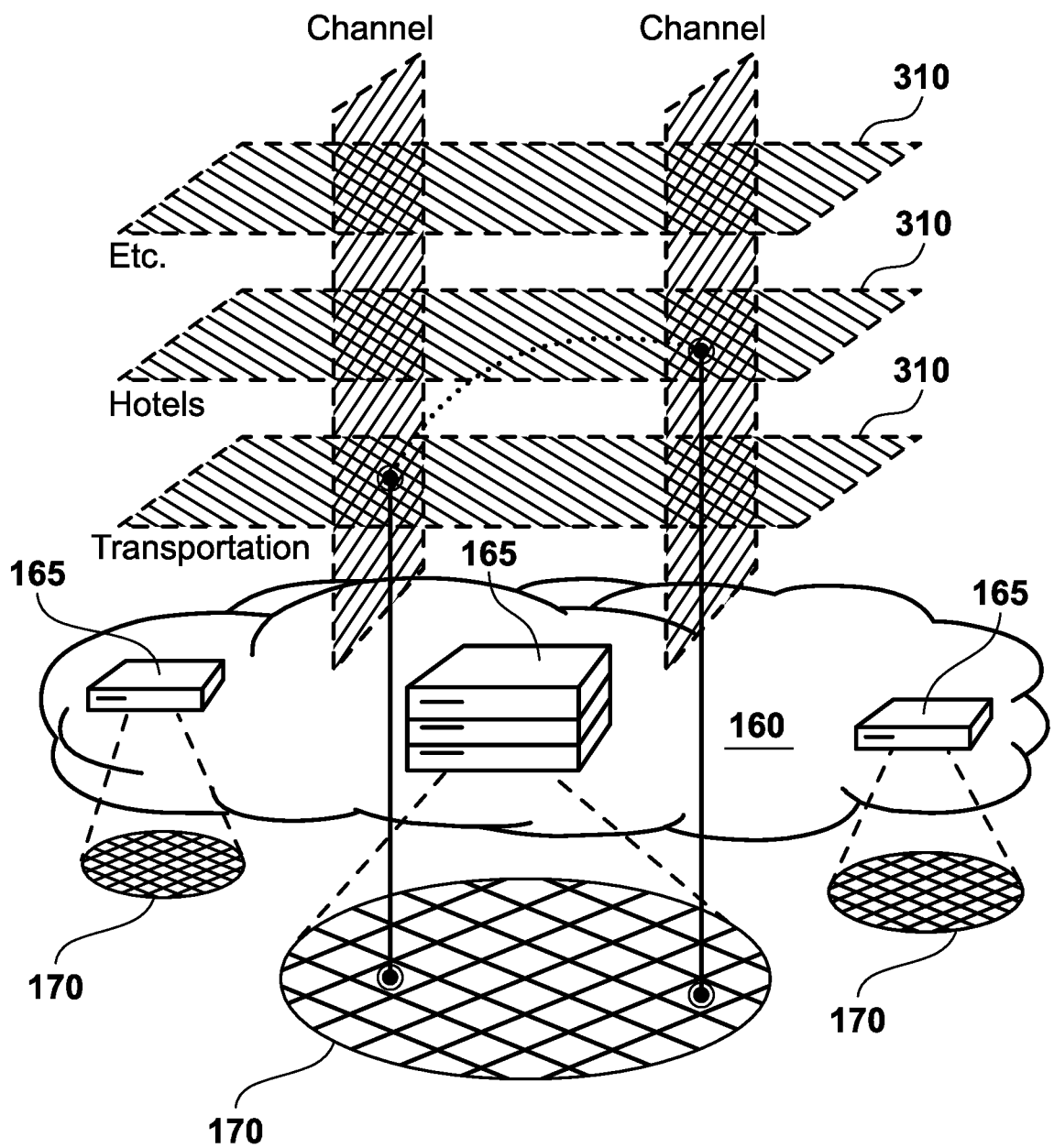
FIG. 3 is an illustration demonstrating how a decentralized computing network can generate channel analysis data across various verticals according to certain embodiments.

FIG. 3 is an illustration demonstrating channel analysis data 180 being generated across various multiple verticals 310 according to certain embodiments. The decentralized computing network 160 includes a plurality of nodes 165, each of which are dedicated to channel 170. Each node 165 receives various channel events 175 corresponding to its dedicated channel 170. Each node 165 can process and analyze the channel events 175 to generate channel analysis data 180, which can include real-time metrics pertaining to current channel conditions and/or predictive metrics pertaining to future channel conditions.

This real-time data and/or predictive data can be generated for a plurality of verticals 310 (e.g., business sectors or industries), including those related to transportation, lodging, restaurants, ticket booking, parking services, etc. In certain embodiments, the channel analysis data 180 can be customized specifically to each of the verticals 310. In some scenarios, the channel analysis data 180 can separately compute demand metrics 513 for each vertical 310 and/or for inventory items associated with each vertical 310. For example, demand metrics 513 can be separately computed for inventory items corresponding to room availabilities for a hotel or lodging vertical, vehicle availabilities for a ride hailing or transportation vertical, parking space availabilities for a garage or parking vertical, reservation availabilities for a restaurant or dining vertical, etc.

As mentioned above, the analytics platform 150 can generate notifications and/or GUIs that display or include some or all of the channel analysis data 180. In some cases, these GUIs and notifications can be customized or tailored for to present metrics or data for specific verticals 310. Similarly, any data provided directly to client systems 140 with the analytics platform 150 can be customized or tailored for specific verticals 310 and/or specific client systems 140.

Figure 4:
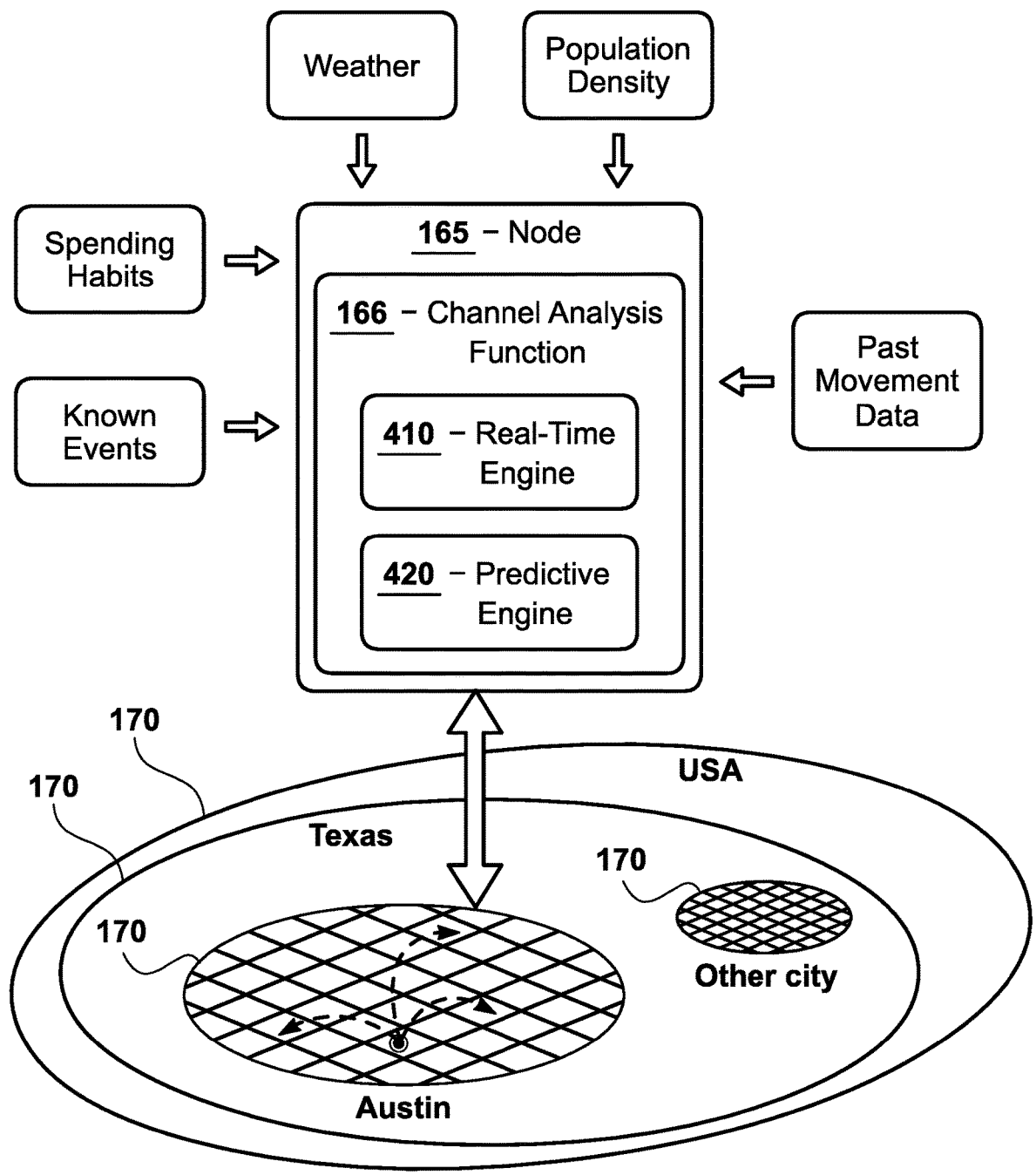
FIG. 4 is an illustration demonstrating aspects of a predictive engine according to certain embodiments.

FIG. 4 is an illustration demonstrating aspects of a real-time engine 410 and a predictive engine 420 according to certain embodiments. In certain embodiments, the real-time engine 410 and the predictive engine 420 can represent subroutines that are executed by a channel analysis function 166 for a node 165 to generate channel analysis data 180 for a channel 170 associated with the node 165.

The real-time engine 410 can be configured to generate channel analysis data 180 pertaining to the current or real-time conditions of the channel 170, and the predictive engine 420 can be configured to generate channel analysis data 180 pertaining to predicted conditions of the channel 170 in one or more future time periods. For example, the real-time engine 410 can generate population surge metrics 511, movement tracking metrics 512, and demand metrics 513 indicating the real-time conditions of the channel 170, while the predictive engine 420 can generate population surge metrics 511, movement tracking metrics 512, and demand metrics 513 predicting conditions of the channel 170 in one or more future time periods. As explained above, the real-time engine 410 and predictive engine 420 can utilize various channel events 175 (e.g., indicating spending habits, schedule events, weather conditions, historical movements of individuals, population density, etc.) to determine the current and future conditions of the channels.

Figure 6:
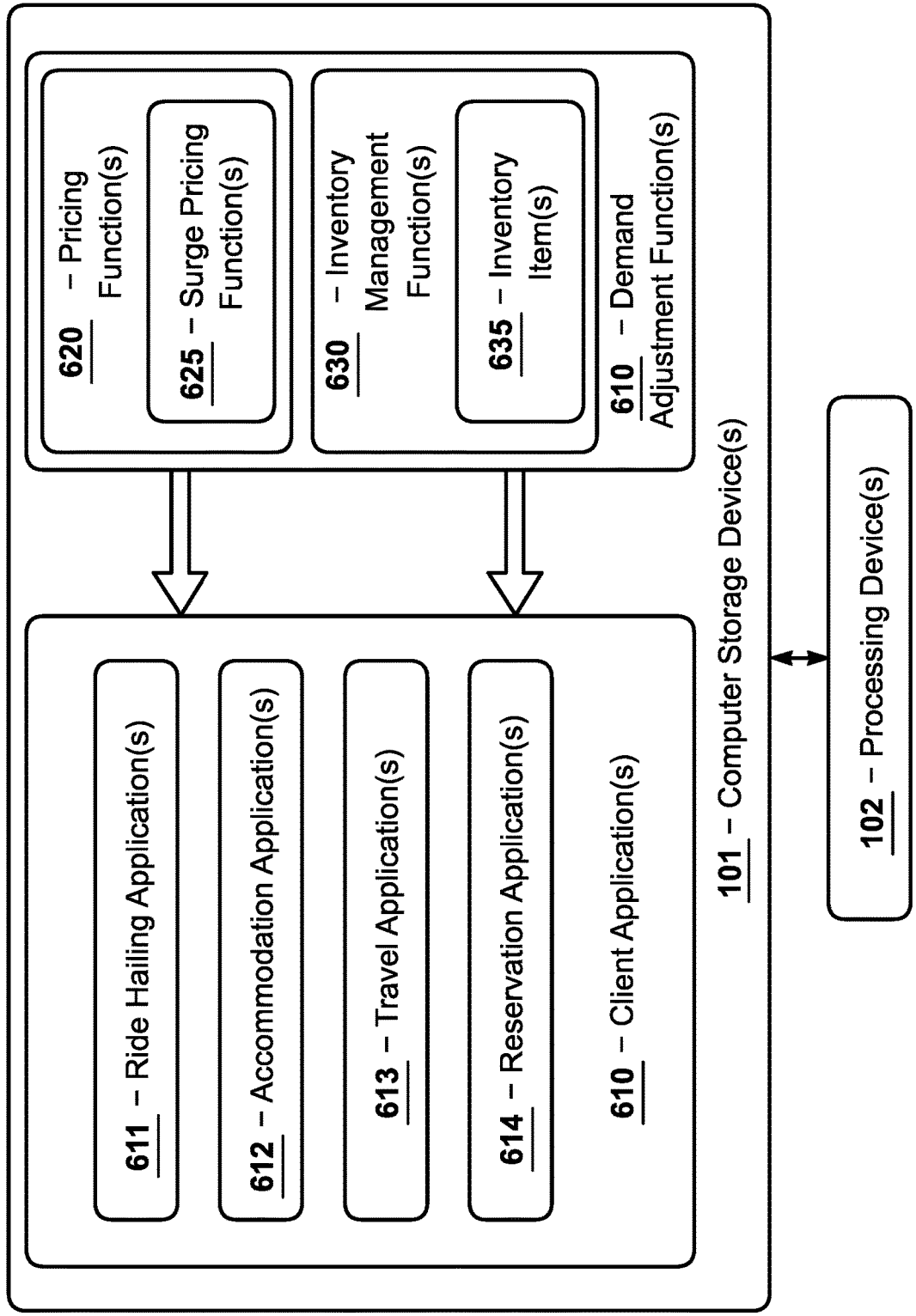
FIG. 6 is a block diagram of an exemplary client system according to certain embodiments.

FIG. 6 is a block diagram illustrating exemplary features, components, and/or functions of a client system 140 according to certain embodiments. The client system 140 can include one or computing devices 110 and/or one or more servers 120, each of which includes one or more computer storage devices 101 and one or more processor devices 102. The client system 140 can host and execute one or more client applications 610.

Exemplary client applications 610 provided by a client system 140 can include one or more of the following: 1) a ride hailing application 611 (e.g., an application that connects passengers with drivers to schedule rides); 2) an accommodation application 612 (e.g., an application that permits guests to schedule rooms or lodging); 3) a travel application 613 (e.g., an application that permits individuals to book schedule transportation with airlines, trains, buses, boats, etc.); and 4) a reservation application 614 (e.g., an application that permits individuals to schedule reservations or tickets for restaurants, concerts, events, bars, parking spaces, and/or other venues). Other types of client applications 610 also may be hosted and executed by the client systems 140. In certain embodiments, the client applications 610 can represent web-based applications that are accessible via a web browser and/or local applications (e.g., mobile apps) that is installed on devices (e.g., mobile devices or smart phones) operated by end-users.

The channel analysis data 180 (e.g., the population surge metrics 511, movement tracking metrics 512, demand metrics 513, and/or other data described herein) can be utilized to enhance various functionalities of the client applications 610. In some scenarios, the channel analysis data 180 can be utilized to enhance or implement one or more demand adjustment functions 650, such as a pricing function 620 and/or an inventory management function 630, for each of the client applications 160. The demand adjustment functions 650 can be configured to adjust pricing and/or inventory information for inventory items based on actual or predicted supply metrics and/or demand metrics for the inventory items. The pricing function 620 and/or inventory management function 630 can be included with the functionality of each of the client applications 610, or can be included in separate applications that communicate with the client applications 610.

The pricing function 620 can utilize the channel analysis data 180 to determine pricing for one or more inventory items 635, which may generally include any type of product or service made available by a client application. For example, depending on the functionality of a given client application 160, the pricing function 620 can determine pricing for ride hailing services, taxi services, lodging accommodations, event tickets (e.g., for sporting events or concerts), airline tickets, train tickets, packing spaces, etc.

In some scenarios, the channel analysis data 180 can be utilized to implement a surge pricing function 625 for one or more of the client applications 610. A surge pricing function 625 generally represents a function that adjusts the price of one or more inventory items 635 based on the demand for the inventory items 635 (e.g., based on a comparison of the supply and the demand for the inventory items 635). The demand metrics 513 (and/or other channel analysis data 180) generated by the analytics platform 150 may be utilized to dynamically adjust the pricing of one or more inventory items 635 offered by each of the client applications 610.

The inventory management function 630 can utilize the channel analysis data 180 to manage or adjust inventory items 635 in various ways. For example, the inventory management function 630 can detect when additional inventory items 635 should be ordered to accommodate a current demand for inventory items 635 and/or a predicted future demand for inventory 635. In some scenarios, the inventory management function 630 also can be configured to automatically place an order for additional inventory items 635 to accommodate a spike in a current or predicted demand for the inventory items 635.

The inventory management function 630 also can reallocate inventory items 635 to accommodate varying supply and demand metrics across different channels 170 and/or within a given channel 170. For example, in some scenarios, a merchant may have multiple business locations, including multiple locations within a given channel 170 and multiple locations situated outside the channel 170. The inventory management function 630 can utilize the channel analysis data 180 to dynamically reallocate inventory items 635 among the business locations in within the given channel 170 to accommodate the varying demands at those locations and/or to maximize sales of inventory items 635 across all locations. Similarly, the inventory management function 630 can utilize the channel analysis data 180 to dynamically reallocate inventory items 635 from a location in one channel 180 to one or more separate channels in order to accommodate the varying demands in each channel 170 and/or to maximize sales of inventory items 635 across all channels 170.

In certain embodiments, the client applications 610 can additionally, or alternatively, be stored on and executed by the analytics platform 150. Similarly, the demand adjustment functions 650 (e.g., including the pricing function 620, the surge pricing function 625, and/or the inventory management function 630) can be stored on and executed by the analytics platform 150.

For example, in certain embodiments, the decentralized computing network 160 can be utilized to execute the demand adjustment functions 650. In addition to generating the channel analysis data 180, each node 165 of the decentralized computing network 160 can execute one or more demand adjustment functions 650 for a channel 170 corresponding to the node 165. In one example, each node 165 can execute a surge pricing function 225 that utilizes the channel analysis data (e.g., the population surge metrics 511 and/or demand metrics 513) to dynamically adjust the pricing of one or more inventory items 635. In another example, each node 165 can execute an inventory management function 630 that dynamically allocates or reallocates inventory items 635 within a channel 170 and/or among a plurality of channels 170.

Figure 2C:
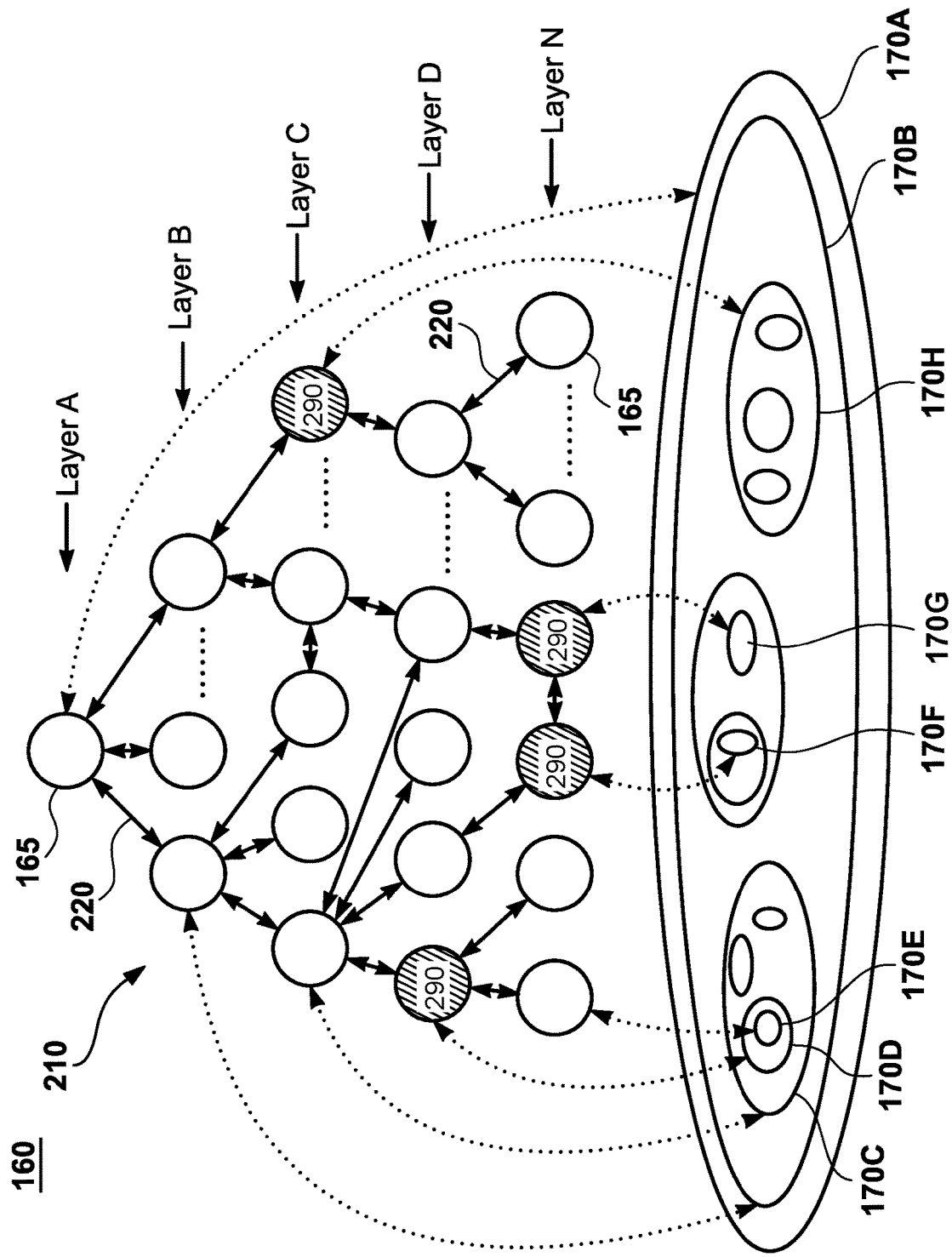
FIG. 2C is a diagram illustrating a decentralized computing network that is configured to execute a demand adjustment function according to certain embodiments.
Figure 2D:
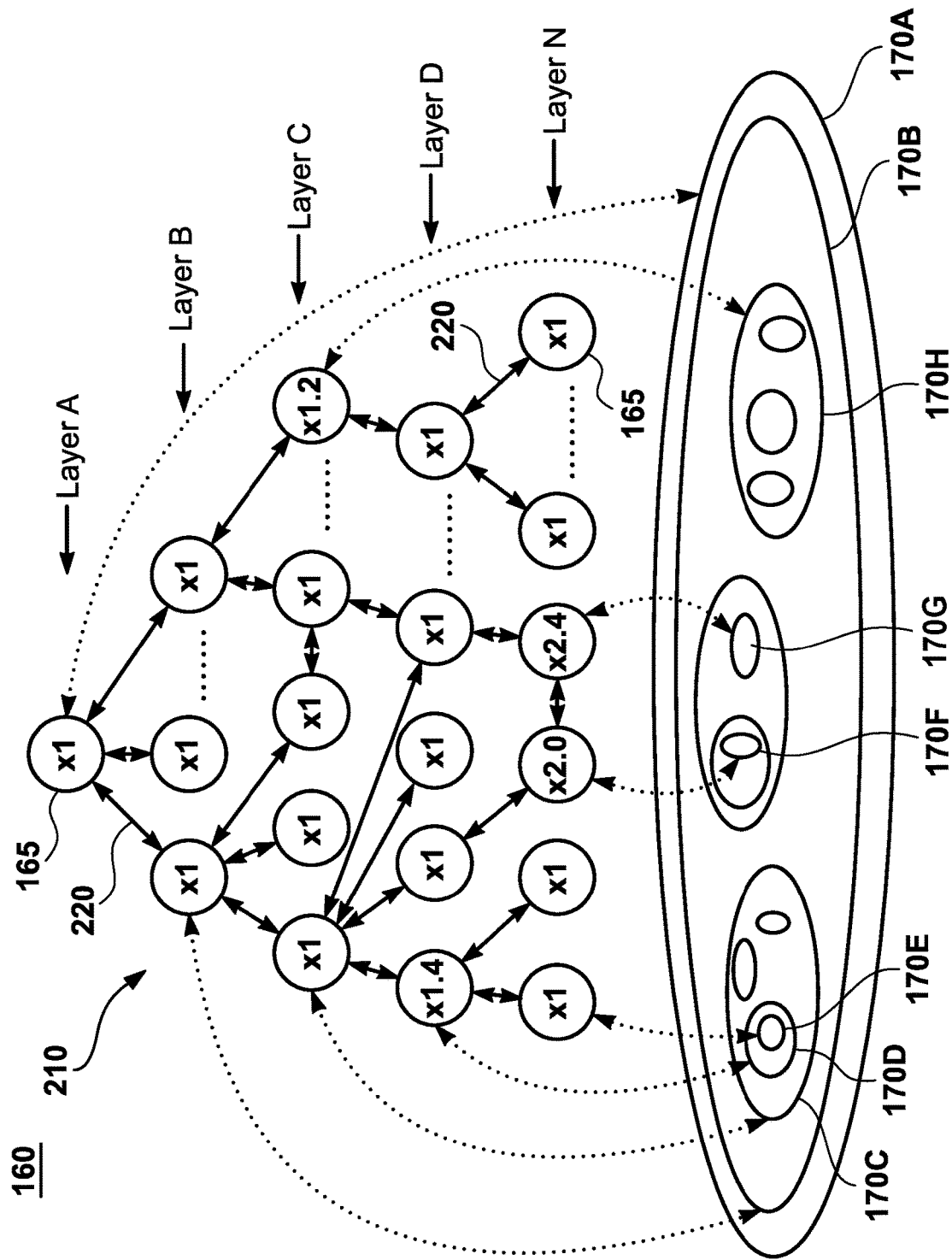
FIG. 2D is a diagram illustrating a decentralized computing network that is configured to execute a demand adjustment function according to certain embodiments.

FIGS. 2C and 2D illustrate examples of a decentralized computing network 160 that is configured to execute demand adjustment functions 650.

In FIG. 2C, four nodes 165 are identified by cross-hashing to indicate that the nodes 165 have detected channel conditions indicating the occurrence of a demand surge 290 for one or more inventory items 635 (or a demand surge 290 in one or more verticals 310) in their corresponding channels 170 (channels 170C, 170F, 170G, and 170H). The demand surge 290 can indicate an upward fluctuation in the demand for the one or more inventory items 635 (e.g., in scenarios where there is a high demand or demand is increasing) and/or a downward fluctuation in the demand for the one or more inventory items 635 (e.g., in scenarios where there is low demand or demand is decreasing). The other nodes 165 (without cross-hashing) correspond to nodes that have not detected a demand surge 290 in their corresponding channels 170.

In some cases, each node 165 may detect the occurrence of demand surge 290 by comparing a first value indicating an actual or predicted demand for one or more inventory items 635 (which may be included in the demand metrics 513 computed by the node 165) with a second value indicating a baseline or standard demand for a channel 170. Additionally, or alternatively, each node 165 can detect the occurrence of demand surge 290 by comparing the first value with a threshold value (e.g., such that a demand surge 290 is detected when the first value exceeds or is below the threshold value). The demand surge 290 can be detected in other ways as well.

In FIG. 2D, each of the nodes 165 included in the decentralized computing network 160 have computed a multiplier (or other value) to be utilized in connection with one or more demand adjustment functions 650. Nodes 165 that have not detected a demand surge 290 indicating an upwardly trending demand in corresponding channels 170 are shown with a multiplier of one (×1). The four nodes identified by cross-hashing in FIG. 2C (i.e., the nodes 165 that have detected an upwardly trending demand surge 290 in their corresponding channels 170) have computed greater multipliers (×1.4, ×2.0, ×2.4, and 1.2), each of which corresponds to the severity or level of the demand surge 290 in a corresponding channel 170.

The multipliers computed by the nodes can be utilized by dynamically modify or update one or more demand adjustment functions 650. For example, consider a scenario in which the nodes 165 are executing a surge pricing function 625 that dynamically adjusts prices for one or more inventory items 635 in channels 170 corresponding to the nodes 165. In this scenario, the multipliers can be utilized to increase the prices for the one or more inventory items 635. Each node 165 may determine an adjusted price for the one or more inventory items 635 by multiplying a baseline price with the multiplier that was computed by the node 165. In some instances, the adjusted price, which reflects an adjustment based on the demand surge, can be utilized by a client application 160 to price the one or more inventory items 635 (e.g., to adjust prices for ride hailing services, hotel rooms, event tickets, etc.).

The multipliers computed by the nodes 165 also can be utilized by an inventory management function 630 to dynamically adjust allocations of inventory items 635. For example, consider a scenario in which a ride hailing service is experiencing a population surge or demand surge in a first set of channels 170, while population or demand conditions in a second set of channels 170 remains normal or constant. In this scenario, the ride hailing service may wish to reallocate inventory items 635 (e.g., drivers) from the channels 170 with lower demand to the channels 170 that are experiencing greater demand. The multipliers computed by the nodes 165 can be utilized to determine the amount of inventory that should be transferred to the channels 170 with greater demand.

In some embodiments, each of the nodes 165 also be configured to detect or determine a supply surge (rather than a demand surge 290, or in addition to calculating the demand surge 290). The supply surge can indicate an upward fluctuation in the supply for the one or more inventory items 635 (e.g., in scenarios where there is a high supply or the supply is increasing) and/or a downward fluctuation in the supply for the one or more inventory items 635 (e.g., in scenarios where there is low supply or supply is decreasing). This supply surge can be utilized in a similar manner to the demand surge 290, such as to implement pricing adjustment functions and/or inventory management functions. For example, a high supply surge may result in lowering prices or inventory levels, while a low supply may result in raising prices or inventory levels.

In some instances, the supply surge or supply-related information can be utilized in computing the demand surge 290. For example, the detection of a demand surge 290 can involve consideration of both the supply and demand for one or more inventory items 635, and the one or more demand adjustment functions 610 can adjust pricing information and/or inventory allocations based on a joint consideration of the supply and demand information for the one or more inventory items 635.

FIG. 7 illustrates a flow chart for an exemplary method 700 according to certain embodiments. Method 700 is merely exemplary and is not limited to the embodiments presented herein. Method 700 can be employed in many different embodiments or examples not specifically depicted or described herein. In some embodiments, the steps of method 700 can be performed in the order presented. In other embodiments, the steps of method 700 can be performed in any suitable order. In still other embodiments, one or more of the steps of method 700 can be combined or skipped. In many embodiments, system 100, analytics platform 150, and/or decentralized computing network 160 can be configured to perform method 700 and/or one or more of the steps of method 700. In these or other embodiments, one or more of the steps of method 700 can be implemented as one or more computer instructions configured to run at one or more processing devices 102 and configured to be stored at one or more non-transitory computer storage devices 101. Such non-transitory memory storage devices 101 can be part of a computer system such as system 100, analytics platform 150, and/or decentralized computing network 160.

In step 710, a decentralized computing architecture or network 160 comprising a plurality of nodes 165 is provided. In certain embodiments, the nodes 165 included in the decentralized computing architecture 160 can be arranged in a geographical hierarchy 210 that links the nodes 165 using parent-child relationships 220 based on geographical associations.

In step 720, each node 165 of the decentralized computing architecture or network 160 is associated with a separate channel 170 corresponding to a geographic region. For example, each node 175 in the decentralized computing architecture 160 can be dedicated to a particular channel 170 such that the node 175 receives and processes data exclusively and/or independently for the channel 170.

In step 730, each node 165 of the decentralized computing architecture or network 160 receives and analyzes channel events 175 for the channel 170 associated with node 165. For example, each node 165 can receive various types of channels events 175 relating to conditions of an associated channel 170. Exemplary channel events 175 can include location data 501, transaction data 502, user demographic data 503, merchant data 504, weather data 505, and/or event data 505.

In step 740, each node 165 generates channel analysis data 180 corresponding to the channel 170 associated with the node 165 based, at least in part, on an analysis of the channel events 175 corresponding to the channel 170 associated with the node 165. The channel analysis data 180 can be include various metrics including, but not limited to, population surge metrics 511, movement tracking metrics 512, and/or demand metrics 513. The channel analysis data 180 can include both real-time data that indicates current conditions of the channel 170 and/or predictive data that predicts future conditions of the channel.

In some embodiments, the decentralized computing network 160 can utilize the channel analysis data 180 to execute one or more demand adjustment functions, such as a pricing function 620, surge pricing function 625, and/or inventory management function 630. In certain instances, each of the nodes 165 in the decentralized computing network 160 can analyze the channel analysis data 180 (e.g., the demand metrics 513) to determine if a demand surge 290 exists for an inventory item 635 in a corresponding channel 170. In response to detecting a demand surge 290 in a channel 170, the node 170 associated with the channel 170 can determine a multiplier (or other value) that is used to determine and/or adjust the price of inventory item 635 or used to adjust allocations of the inventory items 635.

In step 750, one or more deployment functions 190 can be executed to enable the channel analysis data 180 to be accessed and/or utilized by one or more client systems 140.

The deployment functions 190 can enable the client systems 140 to utilize the channel analysis data 180 to enhance the functionalities of one or more client applications 610. One exemplary deployment function 190 can include a notification function 191 that transmits notifications to the one or more client systems 140 and/or displays the notifications on one of more GUIs that are accessible via an analytics platform 150. Another exemplary deployment 190 can include an interfacing function 192 that interfaces the analytics platform 150 with various the client applications 610 and/or client systems 140, thereby enabling those external applications and/or systems to directly access the channel analysis data 180. In some instances, a client application 610 that is interfaced with the analytics platform 150 can utilize the channel analysis data to execute a pricing function 620, surge price function 625, and/or an inventory management function 630. As evidenced by the disclosure herein, the inventive techniques set forth in this disclosure are rooted in computer technologies that overcome existing problems in known networking and data processing systems, including problems dealing with utilizing a centralized network architecture to process data over multiple channels or geographic regions. The techniques described in this disclosure provide a technical solution (e.g., that utilizes improved decentralized computing networks) for overcoming the limitations associated with known techniques. This technology-based solution marks an improvement over existing capabilities and functionalities related to processing data across multiple channels or geographic areas.

In certain embodiments, the techniques described herein can be utilized continuously at a scale that cannot be reasonably performed using manual techniques or the human mind. For example, in many embodiments, real-time information from large numbers of channels or geographic areas can be simultaneously processed and analyzed to provide real-time updates to client systems. This simultaneous processing of real-time data cannot be performed by a human mind.

Additionally, in certain embodiments, the techniques described herein solve a technical problem that arises only within the realm of computer networks, as decentralized computer networks or architectures do not exist outside the realm of computer networks.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It should be recognized that any features and/or functionalities described for an embodiment in this application can be incorporated into any other embodiment mentioned in this disclosure. Moreover, the embodiments described in this disclosure can be combined in various ways. Additionally, while the description herein may describe certain embodiments, features, or components as being implemented in software or hardware, it should be recognized that any embodiment, feature, or component that is described in the present application may be implemented in hardware, software, or a combination of the two.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A computerized method for processing data in a decentralized, cloud-based computing environment, comprising:
providing a decentralized computing network hosted in a cloud-based computing environment for processing data across multiple channels, wherein the decentralized computing network comprises a plurality of nodes that are associated with channels corresponding to geographic regions and the plurality of nodes included in the decentralized computing network are arranged in a geographical hierarchy that defines parent-child relationships based on geographic associations;
associating each of the plurality of nodes included in the decentralized computing network with one or more virtual machines in the cloud-based computing environment, the one or more virtual machines being configured to process data for the channels corresponding to each of the plurality of nodes;
analyzing, by a node executed on at least one virtual machine, channel events corresponding to a channel associated with the node;
generating, by the node executed on the at least one virtual machine, channel analysis data based, at least in part, on an analysis of the channel events corresponding to the channel associated with the node;
detecting, by the node executed on the at least one virtual machine, a demand surge in the channel based on the channel analysis data; and
wherein, in response to detecting the demand surge, a demand adjustment function is executed that adjusts a price of one or more inventory items based, at least in part, on a demand for the one or more inventory items in the channel or adjusts allocations of the one or more inventory items based, at least in part, on the demand for the one or more inventory items in the channel.

2. The computerized method of claim 1, wherein the cloud-based computing environment comprises a node manager that manages creation of the one or more virtual machines and allocation of the plurality of nodes to the one or more virtual machines.

3. The computerized method of claim 2, wherein:
the node manager is further configured to monitor workloads associated with the channels corresponding to each of the plurality of nodes; and
the node manager is further configured to dynamically adjust or allocate resources to each of the plurality of nodes based on the workloads associated with the channels.

4. The computerized method of claim 1, wherein each of the at least one virtual machines associated with the node corresponds to a process virtual machine that receives the channel events corresponding to the channel, executes a channel analysis function to generate the channel analysis data, and detects the demand surge in the channel.

5. The computerized method of claim 1, wherein each of the plurality of nodes is dedicated to separately and independently process the channel events associated with a corresponding channel and to generate the channel analysis for the corresponding channel without processing global data across all of the channels.

6. The computerized method of claim 5, wherein a node communication protocol enables exchange of data among the plurality of nodes in the cloud-based environment.

7. The computerized method of claim 1, wherein the channel analysis data generated by the node executed on the at least one virtual machine comprises:
population metrics predicting or indicating population fluctuations in the channel associated with the node;
movement tracking metrics predicting or indicating movements of individuals within the channel associated with the node; and
demand metrics predicting or indicating the demand for the one or more inventory items in the channel associated with the node.

8. The computerized method of claim 1, wherein:
an interfacing function enables one or more client systems to access the channel analysis data via an application programming interface associated with the decentralized computing network; and
the at least one client system is configured to execute the demand adjustment function.

9. The computerized method of claim 1, wherein a node communication protocol enables communication among the plurality of nodes in the cloud-based environment and comprises a blockchain protocol to facilitate an exchange of data among the plurality of nodes included in the cloud-based environment.

10. A system for processing data in a decentralized, cloud-based computing environment, comprising:
a cloud-based computing environment hosted on a plurality of servers, wherein the cloud-based computing environment comprises one or more processing devices and one or more non-transitory computer storage devices storing computing instructions which, when executed by the one or more processing devices, causes the one or more processing devices to implement a decentralized computing network in the cloud-based computing environment for processing data across multiple channels, wherein the decentralized computing network comprises a plurality of nodes that are associated with channels corresponding to geographic regions, wherein:
the plurality of nodes included in the decentralized computing network are arranged in a geographical hierarchy that defines parent-child relationships based on geographic associations;
each of the plurality of nodes included in the decentralized computing network is allocated to one or more virtual machines in the cloud-based computing environment, the one or more virtual machines being configured to process data for the channels corresponding to each of the plurality of nodes;
channel events corresponding to a channel are received and analyzed by a node executed on at least one virtual machine in the cloud-based environment;
channel analysis data is generated by the node executed on the at least one virtual machine based, at least in part, on an analysis of the channel events corresponding to the channel associated with the node;
a demand surge in the channel is detected based on the channel analysis data generated by the node executed on the at least one virtual machine; and
in response to detecting the demand surge, a demand adjustment function is executed that adjusts a price of one or more inventory items based, at least in part, on a demand for the one or more inventory items in the channel or adjusts allocations of the one or more inventory items based, at least in part, on the demand for the one or more inventory items in the channel.

11. The system of claim 10, wherein the cloud-based computing environment comprises a node manager that manages creation of the one or more virtual machines and allocation of the plurality of nodes to the one or more virtual machines.

12. The system of claim 11, wherein:
the node manager is further configured to monitor workloads associated with the channels corresponding to each of the plurality of nodes; and
the node manager is further configured to dynamically adjust or allocate resources to each of the plurality of nodes based on the workloads associated with the channels.

13. The system of claim 10, wherein each of the at least one virtual machines associated with the node corresponds to a process virtual machine that receives the channel events corresponding to the channel, executes a channel analysis function to generate the channel analysis data, and detects the demand surge in the channel.

14. The system of claim 10, wherein each of the plurality of nodes is dedicated to separately and independently process the channel events associated with a corresponding channel and to generate the channel analysis for the corresponding channel without processing global data across all of the channels.

15. The system of claim 14, wherein a node communication protocol enables exchange of data among the plurality of nodes in the cloud-based environment.

16. The system of claim 10, wherein the channel analysis data generated by the node executed on the at least one virtual machine comprises:
population metrics predicting or indicating population fluctuations in the channel associated with the node;
movement tracking metrics predicting or indicating movements of individuals within the channel associated with the node; and
demand metrics predicting or indicating the demand for the one or more inventory items in the channel associated with the node.

17. The system of claim 10, wherein:
an interfacing function enables one or more client systems to access the channel analysis data via an application programming interface associated with the decentralized computing network; and
the at least one client system is configured to execute the demand adjustment function.

18. The system of claim 10, wherein a node communication protocol enables communication among the plurality of nodes in the cloud-based environment and comprises a blockchain protocol to facilitate an exchange of data among the plurality of nodes included in the cloud-based environment.

* * * * *